United States Patent
Kazi et al.

(10) Patent No.: US 6,270,650 B1
(45) Date of Patent: Aug. 7, 2001

(54) ELECTROLYTIC CELL WITH POROUS SURFACE ACTIVE ANODE FOR REMOVAL OF ORGANIC CONTAMINANTS FROM WATER AND ITS USE TO PURIFY CONTAMINATED WATER

(76) Inventors: Abdullah Kazi, 5552 Dunsbury, San Jose, CA (US) 95123; Roy L. Hays, 1763 Frobisher, San Jose, CA (US) 95124; James W. Buckley, 169 Wyandotte Dr., San Jose, CA (US) 95123

(*) Notice: Subject to any disclaimer, the term of this patent is extended or adjusted under 35 U.S.C. 154(b) by 0 days.

(21) Appl. No.: 08/858,755

(22) Filed: May 19, 1997

Related U.S. Application Data
(60) Provisional application No. 60/013,478, filed on Mar. 15, 1996.

(51) Int. Cl.$^7$ .................................................... C02F 1/461
(52) U.S. Cl. ..................... 205/753; 205/758; 205/760; 204/242; 204/275.1
(58) Field of Search ................... 205/758, 753, 205/760; 204/242, 275, 275.1

(56) References Cited

U.S. PATENT DOCUMENTS

| | | | |
|---|---|---|---|
| 2,773,025 | * 12/1956 | Ricks et al. | 205/758 |
| 3,859,195 | * 1/1975 | Williams | 204/272 |
| 4,786,384 | * 11/1988 | Gerhardt et al. | 205/758 |
| 5,108,563 | * 4/1992 | Cook | 205/758 |

* cited by examiner

Primary Examiner—Arun S. Phasge
(74) Attorney, Agent, or Firm—Frederick J. Zustak, Esq.

(57) ABSTRACT

A wet oxidation/reduction electrolytic cell, system, and method for the remediation of contaminated water is disclosed. A porous electrode of large surface area produces powerful oxidizing agents in situ without having to add any reagents, oxidizers, or catalysts to the water to be treated. Further, by the appropriate selection of electrode material, organic contaminants may be absorbed onto the surface of the electrode and subsequently oxidized to provide a dynamically renewable porous electrode surface. Flow rates, and power requirements may be tailored to the specific moieties to be removed, thus allowing local treatment of specific waste streams resulting in direct discharge to a publicly owned treatment works (POTW) or surface water discharge. A novel feature of this invention is the ability to remove both organic and metal contaminants without the addition of treatment reagents or catalysts.

18 Claims, 4 Drawing Sheets

ELECTROLYTIC CELL WITH POROUS SURFACE ACTIVE ANODE FOR REMOVAL OF ORGANIC CONTAMINANTS FROM WATER AND ITS USE TO PURIFY CONTAMINATED WATER

CROSS REFERENCE TO RELATED APPLICATIONS

This patent application is related to the provisional application of the same title, Ser. No. 60/013,478, filed Mar. 15, 1996, filed by us, the benefit of which filing date we claim under 35 U.S.C. §119(e).

FIELD

This invention is directed to an apparatus and method for the remediation of contaminated water, and more particularly to an electrolytic oxidation-reduction cell for the continuous remediation of water, in particular the treatment of organic and inorganic contaminants in contaminated groundwater, surface water, and wastewater, and continuous processes therefore.

BACKGROUND

Environmental laws and their resulting regulations are placing an increased emphasis on the water quality of both surface waters and ground water. Previously acceptable methods for disposing of contaminated water are now either no longer allowed or subject to strict permit requirements. Discharges of industrial wastewater, for example, must meet stringent discharge concentration limits for heavy metals such as copper, lead, nickel, mercury, cadmium, chromium VI, zinc, and silver. Other controlled pollutants include chlorofluorocarbons, pesticides, and halides. Municipalities now generally require a manufacturer to obtain a discharge permit prior to the manufacturer being allowed to discharge its waste water to a publicly owned treatment works (POTW). The permit generally places upper limits on the concentrations of the various pollutants, prohibiting discharges where the concentration of any individual critical contaminant exceeds the permitted level.

These discharge limits are ultimately defined by the water quality standards set forth by the federal government and are based on the use intended for the body of water; e.g., recreation, swimming, fishing, and drinking. Discharges from the POTW must conform to the federal standards. Consequently, industrial discharges to the POTW must not be so contaminated as to exceed the ability of the POTW to either treat the waste, reduce the concentration by dilution, or to pose a threat to the biology of the POTW. Likewise, any industry discharging directly to a stream, river, groundwater that eventually finds its way to a navigable body of water is also subject to the stringent federal clean water standards.

In an effort to meet either the POTW discharge permit requirements or the federal National Pollution Discharge Elimination System (NPDES) standards for discharge to surface bodies of water, many industrial companies pre-treat their industrial waste water prior to discharge. Generally, the waste water from all operations are piped to a end-of-pipe treatment facility wherein the pH of the combined waste water is adjusted to favor precipitation of sulfite and hydroxide salts as sodium bisulfite and/or lime is introduced to the combined waste. This pre-treatment method is inadequate for a number of reasons including: 1) more stringent discharge requirements demand concentration levels that are less than the equilibrium level of the dissolved metal using the foregoing treatment chemistries; 2) "fines" or small particles of precipitate may pass through the pre-treatment system and into the environment; 3) the mix of various metals and other contaminants make any single type of treatment a compromise, at best, since each metal has its own optimum pH and chemistries for precipitation (i.e., different metal-hydroxide solubility curves); and 4) the raw materials cost of the sodium bisulfite and lime can be very high, particularly where flow rates of waste water are high. Further, pre-treatment processes are batch processes wherein a sufficient amount of waste water is first accumulated. When a sufficient quantity of waste water has been accumulated, the precipitants are added. The batch nature of this pre-treatment process requires that large holding tanks be provided to collect the waste water, a possible back-up tank in the event the primary holding tank requires repair, and secondary containment for both tanks, since under current environmental law, spillage of industrial waste water is prohibited as an unpermitted release of a hazardous waste to the environment.

Aqueous organic streams must be remediated as well. Since pesticides and chlorofluorocarbons (CFC's) might otherwise kill the microorganisms associated with a biological treatment operation, the pesticides and CFC's must be concentrated, for example by steam distillation, with the distillate being hauled away for incineration. Other organic contaminants may be bio-remediated. The final effluent may be passed through an activated carbon column for "polishing" the pre-treated waste water thus rendering the polished waste water suitable for reuse for certain uses at the industrial site. However, the cost of periodic renewing or recharging, and eventually replacing the activated carbon, makes this operation economically less desirable than to merely discharge the pre-treated water and to purchase or manufacture "new" deionized water.

In addition to the large capital cost outlay of installing a pre-treatment facility, as well as the staffing, maintenance and operational costs associated with running the facility, there are regulatory requirements requiring a permit to operate the facility and requirements for monitoring the performance of the facility.

In many instances, clean water standards, particularly those associated with contaminated groundwater, are technology based. In other words, should a hazardous waste spill result in contamination of an underlying aquifer, remediation of the contaminated groundwater will be required until the specific contaminants are "undetectable". However, with the continuing advances made in quantitative chemical measurement instruments, the non-detectable limits are now being pushed from the parts per million range to a fraction of a part per billion. Consequently, remediation of a contaminated groundwater site that might have previously involved removal of just a few thousand gallons of water for incineration or other hazardous waste disposal, would now require removal and disposal of many millions of gallons of water. Removal and disposal of this quantity of water would be extremely cost prohibitive. Unfortunately, however, presently available technologies that enable the treatment of contaminated groundwater to achieve a level of cleanliness that will permit reinjection of the treated groundwater into the aquifer require multistage separation operations, require the removal and disposal of the separated hazardous waste, and costs many millions of dollars. What is needed is a single pass, low cost technology that will achieve the clean water standards to permit reinjection of treated groundwater back into the aquifer without having to dispose of the remediated contaminant.

A process for the direct catalytic oxidation of hydrocarbons is taught by Sen et al., U.S. Pat. No. 5,393,922. They teach the use of an externally supplied oxidizing agent, such as hydrogen peroxide, in the presence of a metallic or metal salt catalysts. In this case, an external supply of hydrogen peroxide, an extremely caustic compound, must be made available in order to perform the process. Further, the process is taught for the remediation of light organic compounds, and not for inorganic compounds and metals.

Soresen et al. Teach a method for treating polluted material such as industrial waste water involving a wet oxidation process by using an externally supplied oxidizing agent such as potassium permanganate, hydrogen peroxide, a peroxodisulphate, a hypochlorite, and the like. Also, they teach a batch process, thus significantly limiting the throughput of the process and requiring large holding tanks and large reactor.

A waste water treatment process is described by Ishii et al., U.S. Pat. No. 5,399,541, whereby organic compounds are decomposed using a two component catalyst, the first component being iron oxide and the second component being selected from a noble metal. The described process, however, requires an oxygen gas source to supply oxygen at between 1 to 1.5 the required stoichiometric amounts for complete oxidation of the organic contaminants, as well as raising the temperature of the wastewater to between 100° and 370° C. at a pressure sufficient to prevent boiling of the wastewater. These process conditions would necessarily entail a batch-type operation, and a complex insulated reactor and boiler system. The capital costs, and operating expense of maintaining such a system would necessarily exceed that of more conventional organic treatment systems (such as rotating biological contactors or RBCs), and would pose additional hazards due to the temperatures and pressures involved.

Accordingly, there is an escalating need for a water remediation apparatus and method that are not subject to the limitations and potential safety hazards associated with the background art; that do not require the use of additional precipitants, oxidizers, and catalysts, the use of which results in an increase the total dissolved solids (TDS) of the pre-treated effluent, or other externally supplied reagents; one that can be moved "up the pipe" prior to combining treatment incompatible waste water streams, and onto the manufacturing floor where waste water streams are segregated, and attached to process equipment for local waste water treatment to permit direct discharge from the process to the POTW without the need for pretreatment (or pretreatment permit); and one that can be fine tuned to the contaminants of interest to better able meet increasingly stringent discharge requirements.

THE INVENTION

OBJECTS

Accordingly, it is an object of this invention to provide a system and method for remediating water by electrolytic oxidation/reduction of both organic and inorganic contaminants that overcomes the limitations of the background art, and permits remediation without the need for externally supplied reagents, catalysts, or oxidizing agents, and without the need for exotic or dangerous process conditions.

It is another object of this invention to provide a system and method where the working surfaces of the electrolytic cell of this invention have dynamically renewable electrode surfaces, thus avoiding dispensable system components or the periodic regeneration of system components.

It is another object of this invention to provide a modular electrolytic wet oxidation cell that can be ganged depending to achieve either higher volumetric capacity, or enhanced remediation.

It is another object of this invention to provide a water remediation system producing no hazardous waste residues and whereby the remediation products are either out gassed or are collected as dissolved mineral salts.

It is another object of this invention to provide a water remediation device capable of being attached directly to a manufacturing process to permit localized pollution prevention by being adaptable to the specific contaminant to be removed resulting in enhanced remediation efficiency as compared to end of pipe treatment methods and processes of the background art.

Still other objects will be evident from the specification, claims and drawings of this application.

SUMMARY

The present invention is directed to a novel electrolytic cell for the electrolytic, wet-oxidation/reduction of contaminants in contaminated groundwater, industrial wastewater, contaminated surface waters, and spent process water. The electrolytic cell comprises a reaction chamber containing a porous, electrically conductive electrode; a tubular, foraminous, centrally disposed electrode which also serves as an outlet tube for the treated water; a porous insulator sleeve separating the porous electrode from the central, foraminous electrode; and an inlet port for introduction of the contaminated water to the electrolytic cell.

Where removal of metals is desired, the porous electrode is negatively charged with respect to the central, foraminous electrode, thus reducing the metals from the water. Where organic contaminants are to be removed, the porous electrode is positively charged with respect to the central electrode, thus oxidizing the organic contaminants.

By way of operation, and assuming for this explanation that remediation is directed at organic contaminants, organically contaminated water is introduced to the positively charged, porous anode by way of a distributed flow inlet system. The inlet system distributes the flow over the anode to minimize any channeling of the contaminated water through the anode. Alternately, where the pressure drop through the anode is sufficiently high, the inlet may simply be an inlet tube opening over a sufficient headspace above the anode to permit an even water pressure distribution across the entire headspace area of the anode.

Channeling is prevented by ensuring that the porous electrode fills the annular region between the central electrode and the interior surface of the cell's wall. Where the cell is cylindrical in shape, the porous electrode is an annular cylinder. This ensures that contaminated water does not find a channel around the porous anode, but rather flows through the porous anode.

The anode may be of any porous, conducting material, but preferably one that has a high surface area and a large number of reactive sites to catalyze the various reactions occurring on or near the surface of the material of the porous electrode, such materials including activated carbon; metal plated activated carbon, the metals including, but not limited to silver, gold, ruthenium, rhodium, and platinum; sintered metal powders; sintered conductive plastics; metal mesh; and conductive, open-cell sponges. The highly conductive surface, and high surface area of the porous electrode results in a low current density, thus preventing formation of hot spots and ensuring minimum polarization of the electrode.

The anode is wrapped around and insulated from the centrally disposed cathode by a porous insulating sleeve. The sleeve may be any non-conductive, porous material, including but not limited to foraminous plastic membranes; plastic or fabric screens and meshes, and the like, to form a porous, insulating sleeve around the central electrode.

Again, assuming organic compounds as the contaminant, the contaminated water flows through the anode and the organic contaminants are oxidized to carbon dioxide, nitrates, and sulfates depending on whether the contaminant molecules contain carbons, nitrogens, or sulfurs. The carbon dioxide is removed as a dissolved gas in the treated water, or is out gassed through the foraminous, tubular cathode outlet port.

A novel feature of this invention is that, unlike the processes of the background art, external reactants, oxidizers, and catalysts are not required. All of the oxidizing and reducing agents used to remediate the contaminants are generated from the water being remediated within the cell. It is well known that water exists in a partially ionized state as $H^+$, and $OH^-$, in equilibrium at a neutral pH, according to the equation:

$$H_2O \leftrightharpoons H^+(10^{-7}M) + OH^-(10^{-7}M) \tag{1}$$

Consequently, the anode, or positively charged electrode, will tend to become slightly polarized with the hydroxyl ion. Similarly, the cathode, or negatively charged electrode, will tend to become slightly polarized with the hydrogen ion.

We have discovered that with the application of an applied voltage, oxidation and reduction may take place via the free radical intermediates formed during the electrolysis of water to generate hydrogen and oxygen molecules. We have also discovered that the presence of the porous, high surface area, high conductivity, electrode, appears to catalyze and prolong the life of the free radicals and permit the oxidation and reduction reactions to occur on the porous electrode surface. The electrolysis half reactions and their standard oxidation potentials are shown below in Eqs. 1 and 2.

$$2H_2O + 2e^- \leftrightharpoons H_2(g) + 2OH^-(10^{-7}M) \quad E = -0.8277V \tag{2}$$

$$2H_2O \leftrightharpoons O_2(g) + 4H^+ + 4e^-(10^{-7}M) \quad E = +1.229V \tag{3}$$

Equation 2 describes the reaction occurring at the cathode where with voltages lower or less than −0.8277 volts, the hydrogen is stripped from the water molecule and reduced to hydrogen gas. The hydrogen free radical is formed by the intermediate steps:

$$2H_2O + 2e^- \leftrightharpoons 2H. + 2OH^- \leftrightharpoons H_2 + 2OH^- \tag{4}$$

The formation of the hydrogen molecule requires formation of the atomic hydrogen intermediate, H., prior to formation of the dimer. We have discovered that where voltages are less than −0.8277 volts, or where an electrically conductive catalyst surface comprises the cathode thus facilitating the formation of the atomic hydrogen, the formation of atomic hydrogen is available to act as a reducing agent by giving up the free electron to form $H^+$ and, thereby, reducing the metal onto the conductive surface.

Accordingly, using a high surface area, porous electrode as the cathode is preferred when heavy metals are the contaminants of interest. Further, when the waste water is slightly basic, the creation of $H^+$ resulting from the reduction reactions between the metal ion and H. occurring at the surface of the catalyst, tends to neutralize the pH of the treated water.

Additionally, at higher, or more positive, voltages, metals may be plated out directly onto the cathode without the hydrogen radical, and resulting hydrogen gas. For example, Table I lists the metals principally found in industrial waste water discharges and are the metals normally listed as critical contaminants and subject to concentration limits pursuant to a discharge permit. As can be clearly seen, all of the standard oxidation potentials are greater than −0.8277 volts, thus permitting the plating out of the metal at the cathode at voltages not yet negative enough to commence the reduction of hydrogen gas from water. Accordingly, when using the porous electrode as the cathode, the extremely high surface area and low current density results in the following metal contaminants being plated out onto the porous cathode substrate.

TABLE I

Standard Oxidation Potential In a Basic Solution

| Metal | Standard Oxidation Potential |
|---|---|
| Silver | +0.7996 |
| Cadmium | −0.4024 |
| Mercury | +0.852 |
| Nickel | −0.23 |
| Copper | +0.3460 |
| Lead | −0.1263 |
| Zinc | −0.7628 |
| Chromium III | −0.74 |

The above described configuration of using the porous electrode as the cathode immediately suggests an electrolytic wet reduction cell and process incorporated into any process employing heavy metal baths. For example, the preparation of sputtered aluminum substrates for the manufacture of computer direct access storage devices (i.e., magnetic memory disks) requires that the aluminum substrate be first plated with a nickel phosphate compound. Rather than shipping a spent bath to a hazardous waste disposal site or sending it down the drain to an end-of-pipe pretreatment facility, the electrolytic cell of this invention may be attached to the bath to remove metal contaminants in the bath (other than the nickel) thus prolonging the life of the bath. Alternately, the electrolytic cell of this invention may be used to plate out the nickel from the spent bath onto the porous cathode. Once plated out, the water may be in a condition for direct discharge to the sanitary sewer drain without the need for pretreatment. The nickel may be removed by reversing the polarity on the porous electrode (i.e., oxidizing the plated metal) while passing a slightly acidic solution through the electrolytic cell of this invention. The recovered nickel may then be reused, reclaimed, or sold. Similarly, the electrolytic cell of this invention may be used on copper plating lines such as those found in the printed circuit board industry and the semiconductor manufacturing industry, and in photolabs for the recovery of silver.

In a similar fashion, water is oxidized at the anode according to Equation 3. Consequently, where the voltage at the anode exceeds +1.229 volts, oxygen gas is produced. Alternately, the formation of the oxygen free radical is facilitated by a catalyst such as the reactive sites on the porous electrode, electrically connected to now perform as the anode. As in the above offered explanation for the reduction of the metal contaminants, the following proposed mechanism is presented by way of theory and not as a limitation to the scope of the claims of this invention. It is thought that the chemical contaminants, in this case organic contaminants, are adsorbed onto the highly conductive, catalytic surface of the porous anode. When a predetermined voltage is applied to the porous anode, the hydroxyl free radical and atomic oxygen is formed in situ on the surface of the porous anode and immediately reacts with the adsorbed organic contaminant to produce an oxidation product. During oxidation, oxygen gas is evolved via the hydroxyl free radical and atomic oxygen intermediates according to the equation:

$$2OH^- \rightarrow 2HO\cdot + 2e^- \leftrightarrows H_2O + O\cdot \leftrightarrows \tfrac{1}{2}O_2 \qquad (5)$$

Both the hydroxyl radical and the atomic oxygen are powerful oxidizing agents.

We have discovered that the formation of the hydroxyl radical and atomic oxygen on the surface of the porous electrode continually oxidizes any organic matter adsorbed on the high surface area electrode into either low molecular weight, non-hazardous organic compounds such as low carbon number alcohols, ketones, esters, and the like, or to carbon dioxide which is removed by either dissolution in the water or vented off as a gas.

A novel feature of our invention, mentioned above, is that the powerful hydroxyl radical and atomic oxygen moieties are generated in-situ; i.e., no external oxidizing or catalyzing reagent is required to remove the organic contaminants. Further, since the porous anode may be used to catalyze the generation of the hydroxide radical, and atomic oxygen, the action of these powerful oxidizing agents at the electrode surface dynamically renews the surface of the electrode, keeping the electrode surface from becoming blinded by over adsorption of organic contaminants. The value of this feature becomes readily apparent when one realizes the economics associated with never having to change-out or recharge an activated charcoal column. The charcoal, being conductive, may be used in the electrolytic cell of this invention as the high surface area, porous anode. As organic contaminants are adsorbed into the carbon, the contaminants are immediately oxidized. Consequently, the carbon never becomes loaded, and need never be recharged or changed out.

The electrolytic oxidation/reduction cell of this invention may be connected in series or parallel, in any combination. A series connection will enhance the extent of remediation, whereas a parallel connection will enhance the volumetric capacity of the system. A series/parallel system will improve both the extent of remediation and the volumetric capacity.

We have also discovered that a plurality of the electrolytic cells of this invention may be connected in a manner such that some cells have the porous electrode as the anode and other cells have the porous electrode as the cathode. In this system, both organic contaminants and heavy metal contaminants may be simultaneously remediated in a continuous flow-through process.

DRAWINGS

The invention is described in detail by reference to the drawings, in which.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
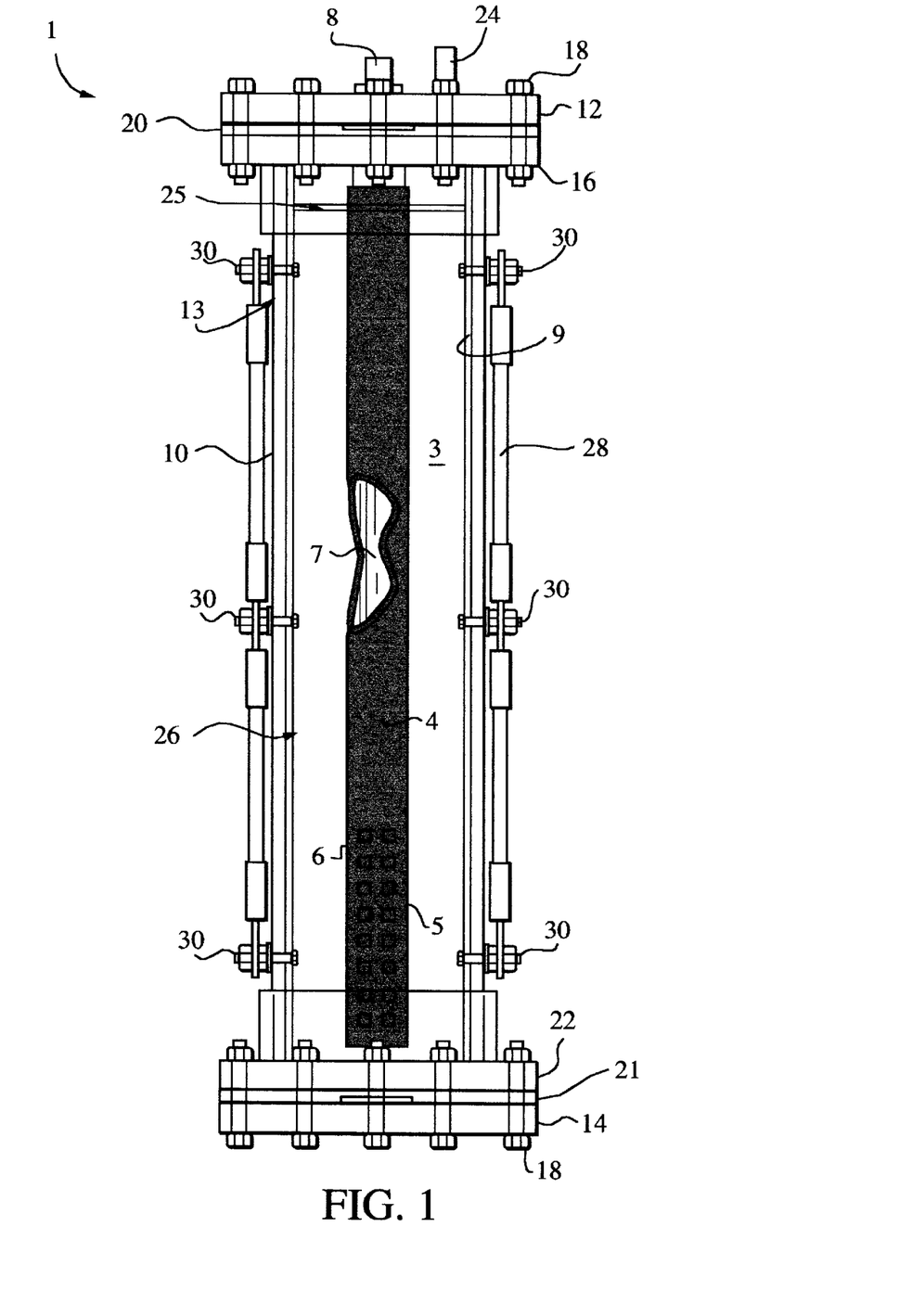
FIG. 1 is a side cross-section view of the preferred embodiment of the electrolytic cell of this invention.

The electrolytic oxidation/reduction cell ("cell") of this invention is shown in cutaway in FIG. 1. The cell 1, while shown as the preferred tube and shell configuration may alternately be configured in any geometry that embodies the novel attributes of the electrolytic cell of this invention, including flat plate geometries.

For purposes of this disclosure, the porous electrode of the electrolytic cell of this invention will be described as the anode. It should be understood, however, that the porous electrode may be used as either an anode or as a cathode, depending on the relative charges of the electrodes of the cell. The cell comprises a centrally disposed cathode 4, an annularly-shaped anode 3 disposed around the cathode and a porous insulator sleeve 5 separating the anode from the cathode. The cathode 4 is electrically conductive and preferably inert to an aqueous solution over a wide pH range (e.g., approximately 3.0–10.5), and is constructed from preferably inert or non-corroding materials such as stainless steel, carbon, gold, platinum, materials plated with these non-corroding materials, and the like. Other materials, equally preferred, include composites where the metals are plated on non-conductive substrates such as silver, platinum, or gold plated ceramics, or plastics.

Oxidation of the organic contaminants occurs by the oxidation of hydroxyl ion into the hydroxyl radical at the anode surface. The hydroxyl radical is short-lived (@1 msec) and combines with another hydroxyl radical to form one molecule of water and an oxygen radical. The oxygen radical is a powerful oxidizer and combines with organic carbon compounds and nitrogen compounds to form carbon dioxide and $NO_x$ compounds. The concentration of hydroxyl radical may be favored by increasing the pH of the contaminated fluid. Once treated the pH can be adjusted back to any desired level. The addition of ferrous sulfate to provide a ferrous ion stabilizes and enhances the formation of hydroxyl radicals.

Removal of organics (i.e., oxidation), requires that the cathode be in electrical connection with the negative side of a power source. The cathode 4 in FIG. 1 is shown as an electrically conductive tube having a hollow cavity 7 therein running longitudinally through the length of the tube. An insulating, porous sleeve 5 provides physical separation of the anode 3 from the cathode 4. Perforations 6 in the cathode 4 permit water to enter the cathode 4, be directed through the cavity 8 and to exit the electrolytic cell 1 through an outlet port 8 from which the treated water is removed. Preferably, the perforations are located on the opposite end of the cell from the fluid inlet port 24 to ensure that the influent travels substantially the entire length of the cell. Alternately, and equally preferred, a separate outlet may be used through which the treated water may be removed.

An insulating enclosure for housing the electrolytic cell includes a generally, longitudinal shell 10 terminated at its ends by a top ported flange cap 12, and a bottom end flange cap 14. The top flange cap is preferably removably mounted to a top flange 16 by way of mounting bolts 18. A flange gasket 20 ensures leakproof connection of the flange cap 12 and the flange 16. Similarly, the bottom flange cap 14 is removably, leakproof-mounted to the bottom flange 22 by way of mounting bolts 22, and a flange gasket 21. Apertures in the top flange cap 12 provide through-holes for the outlet end of the hollow cathode 8, and an inlet port 24 for introduction of influent to the cell. The flanges 16, 22 and the flange caps 12, 14 may be constructed from any material that is inert to the influent to be treated including plastics, composites, stainless steel, and the like.

The cathode shown in FIG. 1 is a hollow, electrically conductive tube. However, a hollow non-conducting tube with a either a solid metal cathode electrode or a liquid electrode centrally disposed in the tube is equally preferred. The advantage of a liquid electrode is that the charge distribution is more evenly spread over the length of the electrode, thus limiting the production of hydrogen gas due to localized charge concentration. Alternately, an electrically conductive sleeve may be disposed either on the inside wall of the insulating tube, thus eliminating the need for an insulating sleeve 5, or between the outside wall of the insulating tube and the insulating sleeve 5. The conductive sleeve may be a metal mesh, an annular-shaped sintered metal cylinder, an annular-shaped conductive foam or sponge cylinder, and the like.

Electric power is applied to the annular-shaped anode 3 by a metal or other electrically conductive material sleeve 26 disposed against the inside wall 9 of the shell 10 of the cell. Preferably an external power bus 28 along the outside wall 13 of the shell includes through-connectors 30 to provide spaced electrical connection through the shell 10 to the conductive sleeve 26 to evenly distribute the positive electrical charge to the porous anode. As the sleeve is in intimate, spaced, physical and electrical contact with the porous conductive anode, the positive charge is dispersed approximately evenly throughout the anode.

The annular electrode 3 must be porous to permit contaminated fluids to flow through it, and it must also be electrically conductive to enable the reduction/oxidation reactions at the electrode surface. Accordingly, any porous, electrically conductive matrix may be used as the porous electrode. It is preferred that the electrode have a high surface area to provide maximum contact with the influent to be treated, and that it does not participate in the oxidation reactions. Consequently, selection of anode material must necessarily consider these factors in view of the pollutants to be remediated. Additionally, the voltages required to remediate the pollutants, and the desired volumetric flow rate through the cell will also affect the decision as to which material is most appropriate. For example, higher voltages for particular remediation reactions may not be appropriate for an activated carbon anode (particularly where there are a high proportion of fines in the carbon) as the higher voltage may cause or aggravate oxidation of the carbon anode, resulting in reduced efficiency of the electrolytic cell.

The porous insulator sleeve 5 may be constructed from any insulating, inert substance such as plastic net or mesh, open cell rigid polymer sponges and foams, and the like. The insulating sleeve prevents direct physical contact of the cathode and the anode in order to prevent a short circuit while permitting the treated fluid flow freely into the hollow, perforated cathode. The insulating sleeve may be dispensed with, however, where, as in the alternate preferred embodiment, an insulating tube is used with the conductive cathode contained or disposed inside the hollow tube.

The following theory as to the thermodynamics which govern the rate of reaction is presented by way explanation and not by limitation of the scope of the claims or as to the subject matter of this invention. Oxidation of both dissolved and particulate aqueous contaminants occurs in part by way of the hydroxyl radical intermediate at the surface of the anode. Since the hydroxyl radical intermediate is short-lived, oxidation occurs principally at the surface of the porous anode. Accordingly, the porous anode must have a high surface area in order to maximize the reactive surface area, thus maximizing water contact.

Figure 2A:
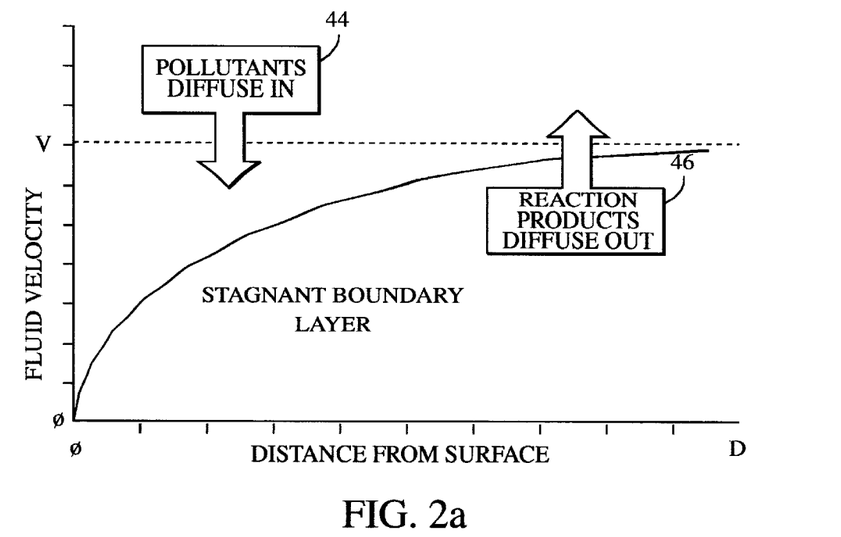
FIG. 2a is a velocity profile chart illustrating the effect of a stagnant boundary layer on a fluid stream passing over a surface.

Surface reactions may be limited, however, in their reaction rates by the amount reactant available. In this case, the rate at which pollutant contaminants reach the surface may limit the rate of oxidation in that diffusion transport becomes predominant near the anode surface. FIG. 2*a* is the velocity profile of a flowing fluid next to a surface. At the surface (and assuming no slip flow), the velocity of the fluid is zero. At some distance D, the velocity of the fluid is equal to the velocity, V, of the bulk fluid stream. At distances less than D, the fluid velocity is less than V; i.e., it is stagnated. Consequently, in the stagnant boundary layer region, transport of bulk fluid contaminants to the surface of the anodic material occurs in part by diffusion, as convective transport becomes less predominant as the fluid velocity approaches zero.

Figure 2B:
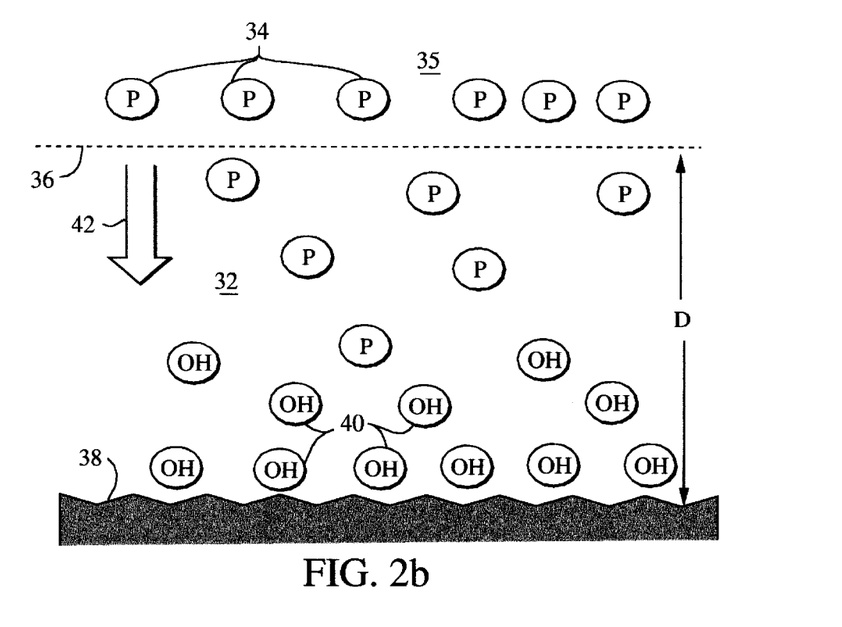
FIG. 2b is a diagram showing the concentration gradient across a stagnant boundary layer of both pollutants and hydroxyl radicals where diffusion of the reactants is a rate limiting step.

Referring now to FIG. 2*b*, the remediation of pollutant molecules is dependent upon the concentration of pollutant molecules 34 at the anode surface 38 as this is where the hydroxyl and oxygen radicals 40 are concentrated. Accordingly, the reaction rate is dependent upon the rate of diffusion 42 of the pollutants to the anode surface which, in turn, will determine the concentration of available reactant (i.e., pollutant molecules) available to react with the hydroxyl and oxygen radicals. By reducing the thickness 36 of the stagnant boundary layer, the concentration of pollutant molecules at the anode surface 38 is increased since the diffusion time required to reach the surface of the anode also decreases as the boundary layer thickness 36 decreases.

The mass transport of pollutant molecules from the bulk fluid 35 to the anode surface(or alternately of hydroxyl radicals from the anode surface through the stagnant boundary layer) is dependent upon several variables including boundary layer thickness, temperature, bulk fluid velocity, bulk fluid pollutant concentration and fluid density. A high surface area increases the bulk fluid velocity by reducing the void volume of the porous anode, thus reducing the thickness of the stagnant boundary layer, resulting in an increase in the rate at which pollutants reach the anode surface, thereby increasing the reaction rate. The high contact area associated with the high surface area also minimizes the amount of time necessary to process the contaminated water. By increasing the surface area, the total flux of pollutant molecules 44 inbound through the boundary layer, or conversely the flux of hydroxyl and oxygen radicals 46 outbound through the boundary layer, is increased (see FIG. 2*a*). Further, by increasing the ratio of anode surface area to fluid volume, the mean contact time of pollutant molecules with the anode surface is increased thus increasing the extent of reaction.

By way of operation, and referring again to FIG. 1, water contaminated with either or both organic and inorganic contaminants is directed into and enters the cell 1 through an inlet port 24 and is directed into a porous, electrically conductive, annular anode region 3. Optionally, the water entering the porous anode is dispersed by a hydraulic flow distributor plate 25, thus minimizing the risk of the fluid channeling through the cell, resulting in reduced efficiency. An electric current at a preselected voltage is applied to the porous anode to produce hydroxyl and oxygen radicals. These radicals react with the pollutants to oxidize organic contaminants to form $NO_x$ and carbon dioxide gases. These gases are either dissolved and out-gassed from the effluent after treatment, or evolved from the electrolytic cell. Once the water is treated within the porous electrode 3, it proceeds through the insulating sleeve 5, through the perforations 6 in the cathode 4, though the center cavity 7 of the cathode and exits the cell through an outlet port 8.

The porous anode material may be comprised of any high surface area, electrically conductive material such as activated carbon, metal coated activated carbon, metal coated aluminum oxide, sintered metals, conductive polymer foams, and the like. Note that the quality of an activated carbon porous anode must be high to minimize the amount of carbon fines. Such particulate carbon will compete with the organic contaminants for the oxygen radical, resulting in a reduced efficiency of the cell. This problem may be mitigated, however, by plating the carbon with a relatively unreactive metal such as silver, gold, platinum, and the like.

A novel feature of the electrolytic cell of this invention is that, unlike a standard carbon absorption column, the carbon need never be recharged or replaced since the absorbed organic contaminants are continuously being oxidized and the reaction product, carbon dioxide, is removed either as a dissolved gas, or as a gas. The advantage of using activated carbon is that it has the property of absorbing organic contaminants onto the carbon surface and retaining it. This results in a high surface concentration of organic reactant thus significantly improving the thermodynamics for the oxidation of these reactants, and improving the efficiency of the cell. Since the pollutants are concentrated at the surface of the anode for immediate reaction with the hydroxyl and oxygen radicals, diffusion of the pollutants through the stagnant boundary layer is no longer a limiting factor. An alternately preferred method for removing organic contaminants is to pump the contaminated influent through the electrolytic cell without applying an electric potential to the electrodes, essentially allowing the cell to perform as a carbon absorption cell. Electric power may then be applied periodically to oxidize the adsorbed organic contaminants, thus renewing the carbon anode. Other conducting materials capable of adsorbing organic contaminants may also be used, including aluminum oxide, ceramics, and the like.

A novel feature of the electrolytic cell of this invention is that the same cell shown in FIG. 1 can be used to remove heavy metal contaminants from the water influent. This is accomplished by connecting the porous electrode to the negative side of a power supply and the centrally disposed electrode to the positive side of a power supply to provide a porous cathode and a centrally disposed anode. As a result, the metals are reduced onto the negatively charged porous anode surface. The reduced metals my be removed from the porous cathode by acid leaching.

Figure 3:
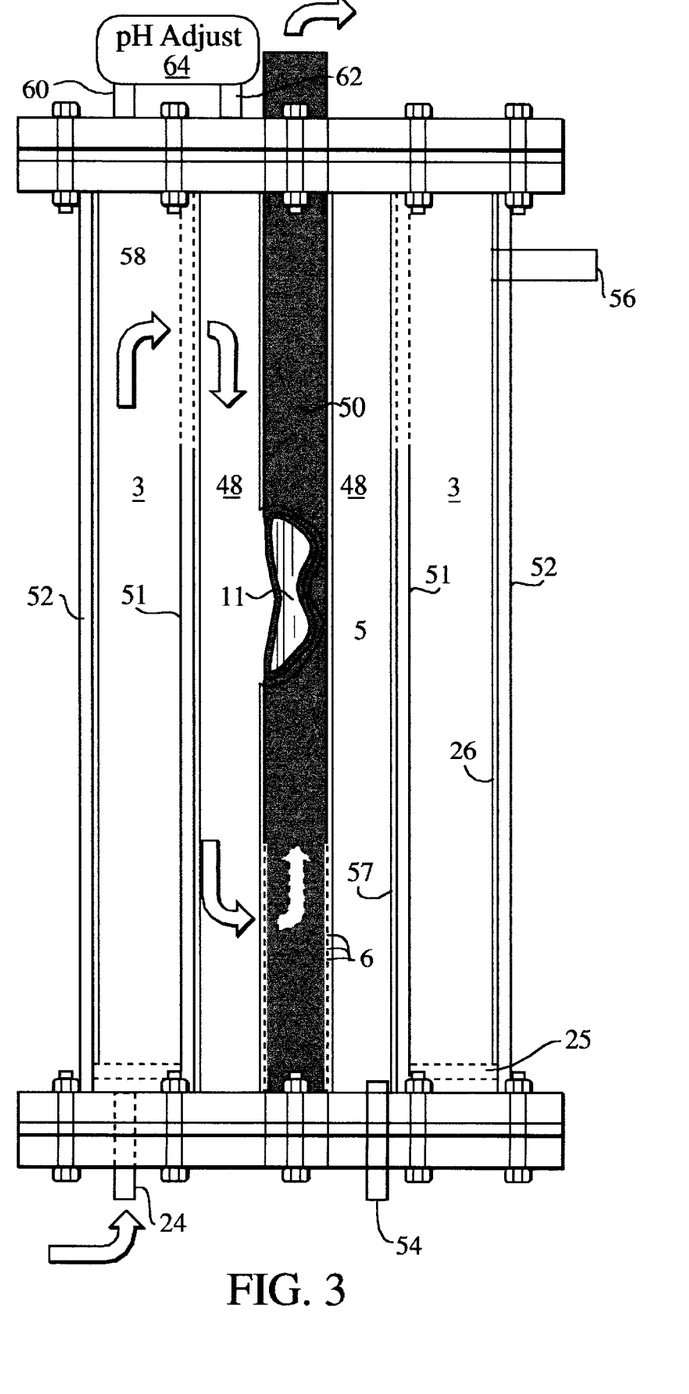
FIG. 3 is a diagram of an alternately preferred multi-electrode electrolytic cell of this invention.

An alternately preferred cell embodiment is shown diagrammatically in FIG. 3 as a combination oxidation and reduction cell. In this combination cell, two annular regions define an anode and cathode. FIG. 3 shows an outer porous annular anode 3, an inner porous annular cathode 48 and a centrally disposed, electrically conductive second anode 50. Each region is physically isolated from the other by either an insulating shell 51, 52 (as between the two annular regions), or by a porous insulating sleeve 5 shown separating the inner annular region from the centrally disposed, electrically conductive anode 50. Each electrode is provided with means for electrical connection 54, 56 to the appropriate polarity of a power supply depending upon whether oxidation or reduction is to take place in the porous, electrically conductive, annular electrodes. These means include a power bus and electrical feed-throughs to a conductive sleeve 26 (as shown in FIG. 1), electrical connection of a conductive sleeve 57 to a flange cap power feed-through, or, alternately, electrical connection to one of each of the flange caps, the flange caps in turn being connected to the appropriate power supply. For example, the top flange cap may be connected to the positive side of a power supply, and connected, as well, to the center anode 50 and the conductive sleeve 26. The bottom flange is connected to the negative side of a power supply, and to the conductive cathode sleeve 57. Perforations 58 in the insulating shell 51 separating the outer annular anode 3 from the inner annular cathode 48, and the perforations 6 on the center anode 50 are placed so as to maximize contact time of the influent with the electrodes. Optionally, an outlet port 60 and an inlet port 62 may be added to permit pH adjustment 64 of the fluid between annular electrodes 3, 48. In this alternately preferred embodiment, the perforations 58 in the insulating shell 51 are omitted.

Figure 4:
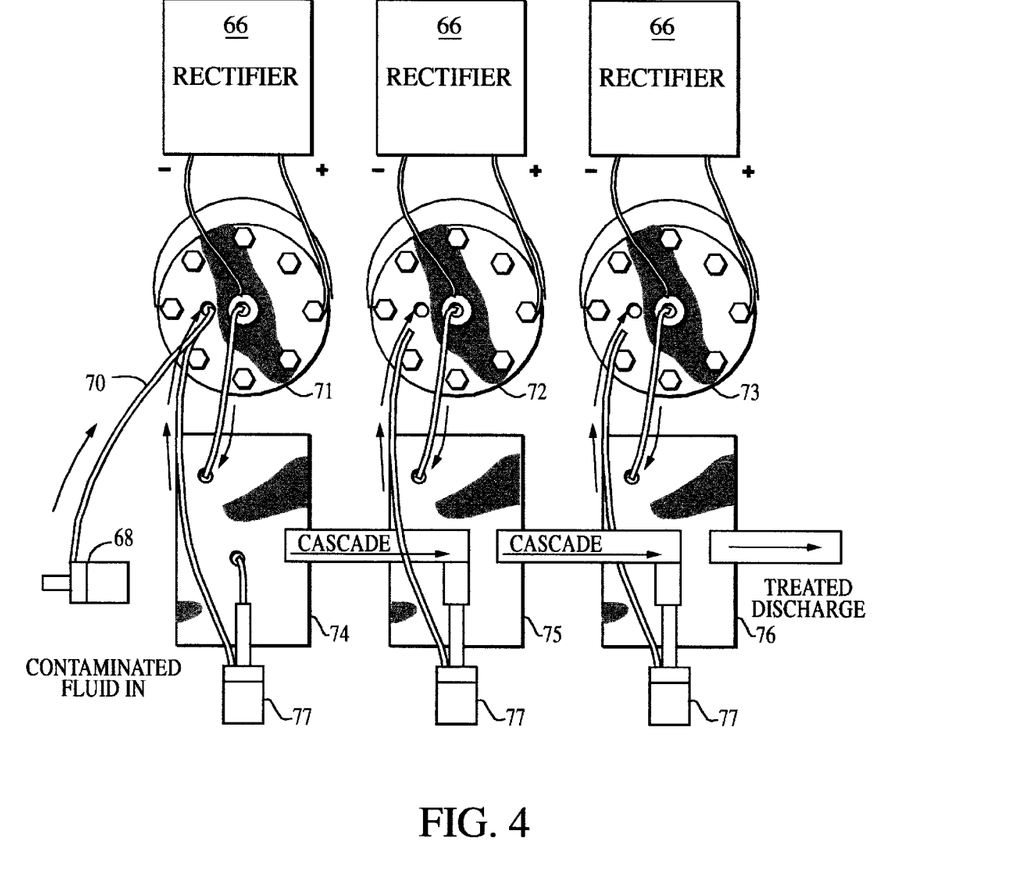
FIG. 4 is a diagram of a series connected wet oxidation, water remediation system.

A remediation system comprising a plurality of cells is shown diagrammatically in FIG. 4. The system shown is set up so that the porous electrode is the anode. Direct current electrical power supplies 66 are connected to each of the electrolytic cells 71, 72, and 73. A feed pump 68 pumps contaminated influent into a first electrolytic cell 71 via line 70. The influent supply may be from a holding tank (not shown) or feed may be directly supplied from a process. After passing through the first cell, the effluent is discharged to a recirculation tank 74. The effluent is recirculated through the first electrolytic cell via a circulation pump 77 until the first recirculation tank fills to a predetermined level at which point effluent in the first circulation tank is cascaded to a second recirculation tank 75. The effluent in the second recirculation tank is continuously recirculated through a second electrolytic cell 72 via a circulation pump until the second recirculation tank attains a predetermined level, at which point the effluent is cascade to a third recirculation tank 76. The effluent in the third recirculation tank is recirculated through a third electrolytic cell via a circulation pump 77 to further remediate the water. Once the third recirculation tank 76 attains a predetermined fill level, the remediated water is either reused or discharged 78 pursuant to local regulations. At steady state, the above described process represents a cascaded, three-stage remediation process whereby the treatment time in any particular stage may be expressed as a residence time. The residence time is equal to the combined volume of the recirculation tank plus the void volume of the corresponding electrolytic cell, divided by the volumetric flow rate of the feed pump 68.

It is clear to a person of ordinary skill in the art that the system may include as many stages as is necessary to achieve the desired level of remediation. The system shown in FIG. 4 includes three cells connected in series, although any number of cells may be connected in series, parallel, or series-parallel, depending on the degree and type of remediation required, and depending on the size and capacity of each cell. Further, the cells may be set up to treat both organics and inorganic contaminants. For example, the system may be set up so that a block of one or more cells is pH adjusted and the porous electrodes therein polarized to provide for the oxidation of organic contaminants. Following that block, a subsequent downstream block of one or more cells may be set up so that the pH is adjusted and the correct polarity established for the reduction of metals onto the electrically conductive porous electrode. Prior to final discharge the pH is re-adjusted to conform with the appropriate discharge standards. By connecting the cells in this fashion, both organic and inorganic contaminants are removed from the water.

Unlike conventional chemical treatment of water, the cell, system and methods of this invention do not contribute to the amount of total dissolved solids (TDS) in the discharged effluent. In fact, no chemicals need be used to remediate the water, including the use of oxidizing agents. Unlike carbon columns for removing organic contaminants, the carbon or other conductive matrix used in the cell of this invention need never be replaced or recharged. The system of this invention may be made "application" or "process specific" thus permitting source treatment at the process equipment level, thus allowing, in the case of industrial wastewater, discharge to the POTW directly from the process itself (as compared to combining the waste streams and treating a plants entire wastewater discharge at end-of-pipe).

EXAMPLE 1

Remediation of Acetone Contaminated Water Using Stainless Steel Packing as Anode A sample of municipal drinking water was spiked with acetone to a concentration of 24 milligrams/liter (24 ppm). The electrolytic cell of this invention was loaded with stainless steel packing as the porous anode, and the spiked sample run through a single pass of the cell at a flow rate of 1 gallon per minute (1 gpm). The results are listed in Table I.

TABLE I

| SAMPLE | DETECTION LIMIT (ppm) | SAMPLE RESULTS (ppm) |
| --- | --- | --- |
| Prior to Treatment | 2.0 | 24 |
| After Single-Pass | 2.0 | 18 |

The single pass at 1 gpm resulted in a 25% reduction in acetone contamination, even with a low surface area, non-adsorbing stainless steel packing.

EXAMPLE 2

Remediation of Process Waste Water

Two gallons of process waste water containing mixed organic contaminants was passed through the electrolytic cell of this invention for fifteen minutes at a volumetric flow rate of five gallons per minute. The results are shown in Table II.

TABLE II

| SAMPLE | SAMPLE RESULTS (ppm) |
| --- | --- |
| Prior to Treatment | 62.00 |
| After Single-Pass | 1.25 |

The reduction of organic contamination from 62 ppm to 1.25 ppm without the addition of any external reagents or catalysts clearly demonstrates the efficacy of the electrolytic cell of this invention.

EXAMPLE 3

Remediation of Contaminated Groundwater

A sample of groundwater was single-passed through the electrolytic cell of this invention. The results are summarized in Table III.

TABLE III

| CONTAMINANT | CONC. PRIOR TO TREATMENT (ppm) | CONC. AFTER TREATMENT (ppm) |
| --- | --- | --- |
| Dichlorodifluoromethane | 0.60 | 0.006 |
| Vinyl chloride | 0.77 | 0.003 |
| 1,1-Dichloroethene | 0.34 | ND |
| Methylene Chloride | 25.1 | 0.09 |
| 1,1-Dichloroethane | 2.02 | 0.006 |
| Chloroform | 2.01 | 0.006 |
| 1,1,1 TCA | 24.3 | 0.005 |
| 1,2-Dichloroethane | 2.62 | 0.005 |
| Benzene | 0.38 | ND |
| Trichloroethene | 28.3 | 0.002 |
| Toluene | 18.0 | 0.007 |
| 1,1,2-Trichloroethane | 1.46 | 0.001 |
| Tetrachloroethane | 53.1 | ND |
| Ethylbenzene | 2.52 | 0.001 |
| 1,1,2,2-Tetrachloroethane | 1.47 | ND |
| TOTALS | 162.99 | 0.132 |

ND = non-detectable

The results achieved after a single pass through the electrolytic cell of this invention are less than two orders of magnitude less than the original sample concentrations.

EXAMPLE 4

Triple Stage Cascade Treatment

A thirty four gallon sample of industrial waste water was spiked with additional acetone to raise the acetone concentration to 280 ppm. A triple stage cascaded remediation system was set up. Flow rates in each stage were set to 1 gpm, and supply voltages for each stage were set to 20 volts, at 20 amperes. The system was permitted to run for forty minutes prior to taking samples at each cascade point. The sample results are summarized as follows:

TABLE IV

| SAMPLE | ACETONE TEST RESULT (ppm) |
| --- | --- |
| Prior to Treatment | 280 |
| First Cell | 130 |
| Second Cell | 56 |
| Third Cell | 19 |

Concentrations of acetone decrease dramatically in going from one stage to the next. It was later determined that the electric current settings of the cells were set much lower than would ordinarily be required for an initial acetone concentration of 280 ppm. Setting the current to a higher level would further improve the results.

Although the present invention described herein and above are preferred embodiments, it is understood that after having read the above description, various alternatives will become apparent to those persons skilled in the art. For example, the porous electrode may be constructed from a more than one porous material. In an equally preferred embodiment, the porous electrode may include an activated carbon portion, and a portion constructed from some other porous conducting material such as a plated ceramic, conductive polymer foam or sponge, sintered metals, and the like. Similarly, different materials may be used for each porous electrode in an electrolytic cell having a plurality of porous electrodes.

We therefore wish our invention to be defined by the scope of the appended claims as broadly as the prior art will permit, and in view of the specification.

We claim:

1. An electrolytic cell adapted to reduce the level of organic pollutants present in a stream of contaminated water remediated therein, which comprises:
   a) an elongate water-tight housing comprising
      (i) an elongate shell having an open end;
      (ii) a plurality of interconnected first electrical connectors fitted at spaced apart points on the exterior surface of the shell and communicating with the interior of the housing and which are adapted to be connected to a positive source of direct current;
      (iii) an end wall adapted to be water tight mounted on the open end of the shell;
      (iv) a water inlet port positioned proximate the open end of the shell and adapted to provide liquid communication between the interior of the shell and a source of the contaminated water;
      (v) a water outlet port positioned proximate the open end of the shell and spaced apart from the water inlet port for discharging from the cell water treated therein; and
      (vi) a second electrical connector communicating with the interior of the housing, which is spaced apart from the plurality of first electrical connectors and adapted to be connected to a negative source of direct current;
   b) an elongate electrically conductive cathode which is electrically connected to the second electrical connector and which comprises liquid communication means for transporting water treated in the cell to the water outlet port;
   c) an elongate anode in the form of a bed of electrically conductive surface active adsorbent particles which fills the interior of the housing between the plurality of first electrical connectors and the cathode; and
   d) an electrically insulating porous wall which provides a uniform space between the cathode and the anode and whose pores provide passage through the wall for water treated in the cell to the liquid communication means of the cathode, whereby the organic pollutants in a stream of polluted water which is passed through the cell while it is connected to a source of direct electric current are adsorbed onto the surface of the particles form the anode and destructively oxidized while adsorbed thereon and the treated water then passes through the insulating wall and the liquid communication means of the cathode and is then discharged from the cell through the water outlet port.

2. An electrolytic cell according to claim 1 wherein the particles are surface active carbon.

3. An electrolytic cell according to claim 1 wherein the housing is a cylindrical shell, open at both ends, with removable caps adapted to be water tight fitted on the ends thereof, one of which has the outlet port positioned axially thereon and the inlet port also positioned thereon offset from the outlet port; the cathode is tubular and is mounted axially in the shell in a water tight communication with the outlet port when the top cap is fitted on the shell; the electrically insulating porous wall is a porous insulator sleeve surrounding the cathode and physically separating it from the anode; and the anode bed surrounds the sleeve, thereby providing a uniform spacing between the exterior surface of the cathode and the surface of the anode closest thereto.

4. An electrolytic cell according to claim 3 wherein the liquid communication means of the cathode are perforations in the wall thereof.

5. An electrolytic cell adapted for lowering the levels of organic pollutants in a stream of polluted water containing them, which comprises:
   a) an inlet port for receiving polluted water;
   b) an outlet port for discharging treated water therefrom;
   c) a centrally disposed hollow cathode having openings therein which provides fluid communication through the interior of the cathode and the outlet port of the cell of water treated in the cell;
   d) an anode in the form of a bed of surface active particulate carbon surrounding the cathode, through which polluted water which enters the inlet port passes while the organic pollutants there in are being lowered electrolytically;
   e) a porous insulating sleeve disposed between the anode and the cathode which physically separates at a uniform distance the porous anode from the cathode while providing liquid and ionic communication therebetween; and
   f) means to impart a positive electrical charge to the anode and a negative charge to the cathode.

6. A remediation system for the removal of organic pollutants from water, comprising at least one electrolytic cell according to claim 5, in combination with a source of positive direct current connected to the anode thereof; a source of negative direct current connected to the cathode thereof; and pumping means for pumping a stream of polluted water successively through the inlet port, the anode bed; the pores of the insulating sleeve, the openings in the cathode, the interior of the cathode and the outlet port.

7. A method for remediating water polluted with organics which comprises passing a stream of the polluted water through a remediation system according to claim 6.

8. A remediation system according to claim 6, in further combination with a recirculation tank and in circulating liquid flow connection with the cell by a circulation pump and wherein an influent stream of polluted water is fed into the recirculation tank, where it is pumped by a circulation pump through the electrolytic cell and the treated water discharged from the cell is returned to the recirculation tank until the level of organic pollutants in the water therein are reduced to a desired lower level.

9. A method for remediating water polluted with organics which comprises passing a stream of the polluted water through a remediation system according to claim 8.

10. A remediation system as in claim 8 comprising a plurality of the electrolytic cells in series, each in combination with a separate recirculation tank and a separate circulation pump and wherein overflow from the upstream recirculation tank is cascaded into the next recirculation tank downstream in the series.

11. A method for remediating water polluted with organics which comprises passing a stream of the polluted water through a remediation system according to claim 10.

12. A remediation system according to claim 10 wherein the particles are surface active carbon.

13. A method for remediating water polluted with organics which comprises passing a stream of the polluted water through a remediation system according to claim 12.

14. A remediation system according to claim 10 wherein the cell comprises a cylindrical shell; a removable top cap with an outlet port positioned axially thereon and an inlet port also positioned thereon offset from the outlet port; a removable bottom cap; wherein the cathode is tubular and is mounted axially in the shell in a water tight configuration when the top cap is mounted on the shell; the electrically insulating porous wall is a porous insulator sleeve surrounding the cathode and physically separating it from the anode; the anode bed surrounds the sleeve, thereby providing a uniform spacing between the exterior surface of the cathode and the surface of the anode closest thereto.

15. A method for remediating water polluted with organics which comprises passing a stream of the polluted water through a remediation system according to claim 14.

16. A remediation system according to claim 14 wherein the liquid communication means of the cathode are perforations in the wall thereof proximate the end thereof which is proximate the bottom cap.

17. A method for remediating water polluted with organics which comprises passing a stream of the polluted water through a remediation system according to claim 16.

18. A method for remediating water polluted with organics which comprises passing a stream of the polluted water through an electrolytic cell having an inlet port for the polluted water and an outlet for the water which has been treated in the electrolytic cell, whose anode is an a bed of particulate activated carbon in liquid communication with the steam of polluted water as it enters the cell through the inlet port; whose cathode is in liquid communication with the stream of water after it has passed through the bed of carbon and the outlet port of the cell; and which comprises porous insulating means which physically separates the exterior surface of the cathode a uniform distance from the exterior surface of the cathode closest thereto and permits treated water to pass from the anode bed through cathode and the outlet port of the cell.

* * * * *